(12) United States Patent
Sakata et al.

(10) Patent No.: US 12,068,108 B2
(45) Date of Patent: Aug. 20, 2024

(54) ELECTROCHEMICAL DEVICE ELECTRODE AND ELECTROCHEMICAL DEVICE

(71) Applicant: Panasonic Intellectual Property Management Co., Ltd., Osaka (JP)

(72) Inventors: Motohiro Sakata, Osaka (JP); Nao Matsumura, Osaka (JP); Masatoshi Takeshita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 618 days.

(21) Appl. No.: 17/293,525

(22) PCT Filed: Dec. 2, 2019

(86) PCT No.: PCT/JP2019/047075
§ 371 (c)(1),
(2) Date: May 13, 2021

(87) PCT Pub. No.: WO2020/121878
PCT Pub. Date: Jun. 18, 2020

(65) Prior Publication Data
US 2021/0407741 A1    Dec. 30, 2021

(30) Foreign Application Priority Data
Dec. 10, 2018    (JP) .................................. 2018-230776

(51) Int. Cl.
*H01G 11/48*    (2013.01)
*H01G 11/52*    (2013.01)
(Continued)

(52) U.S. Cl.
CPC ............. *H01G 11/48* (2013.01); *H01G 11/52* (2013.01); *H01G 11/54* (2013.01); *H01M 4/608* (2013.01); *H01M 2004/028* (2013.01)

(58) Field of Classification Search
CPC ............................... H01G 11/48; H01M 4/608
See application file for complete search history.

(56) References Cited

U.S. PATENT DOCUMENTS

2018/0261403 A1\*    9/2018    Nomoto .............. H01M 4/1399
2018/0323432 A1\*    11/2018    Hayashi ................ H01M 4/364

FOREIGN PATENT DOCUMENTS

| JP | 62-022830 | 1/1987 |
|----|-----------|--------|
| JP | 2014-035836 | 2/2014 |

(Continued)

OTHER PUBLICATIONS

International Search Report of PCT application No. PCT/JP2019/047075 dated Feb. 25, 2020.

(Continued)

*Primary Examiner* — Jonathan G Jelsma
(74) *Attorney, Agent, or Firm* — Rimon P.C.

(57) ABSTRACT

An electrochemical device electrode includes a conductive polymer as an active material. The conductive polymer has a grain shape, and an intensity distribution pattern obtained by X-ray diffraction measurement with respect to the conductive polymer has a first peak in which a diffraction angle 2θ ranges from 18° to 21°, inclusive, and a second peak in which a diffraction angle 2θ ranges from 24° to 26°, inclusive.

3 Claims, 3 Drawing Sheets

(51) Int. Cl.
    *H01G 11/54*     (2013.01)
    *H01M 4/60*     (2006.01)
    *H01M 4/02*     (2006.01)

(56) References Cited

FOREIGN PATENT DOCUMENTS

| WO | WO-2017090231 A1 * | 6/2017 | ............. H01G 11/06 |
| WO | WO-2017130855 A1 * | 8/2017 | ............. H01G 11/06 |

OTHER PUBLICATIONS

English Translation of Chinese Office Action dated May 5, 2022 for the related Chinese Patent Application No. 201980080225.3.
Ye Wang et al, "Preparation and Electrochemical Properties of Polyaniline Matrix Composites", Wanfang, pp. 6, 18-25, 31-34, Aug. 31, 2018 (Aug. 31, 2018).

* cited by examiner

ELECTROCHEMICAL DEVICE ELECTRODE AND ELECTROCHEMICAL DEVICE

This application is a U.S. national stage application of the PCT International Application No. PCT/JP2019/047075 filed on Dec. 2, 2019, which claims the benefit of foreign priority of Japanese patent application No. 2018-230776 filed on Dec. 10, 2018, the contents all of which are incorporated herein by reference.

TECHNICAL FIELD

The present invention relates to an electrochemical device comprising an active material containing a conductive polymer.

BACKGROUND

In recent years, electrochemical devices having intermediate performance between lithium ion secondary batteries and electric double layer capacitors have been attracting attention, and for example, the use of a conductive polymer as a positive electrode material has been studied (for example, Unexamined Japanese Patent Publication No. 2014-35836). Since the electrochemical device containing the conductive polymer as the positive electrode material is charged and discharged by adsorption (doping) and desorption (dedoping) of anions, reaction resistance is small, and the electrochemical device can be charged and discharged at high speed as compared with a general lithium ion secondary battery and has a high output.

Unexamined Japanese Patent Publication No. 62-22830 discloses polyaniline having a fibril structure and a method for producing the same, and its use as an electrode of a secondary battery is proposed.

SUMMARY

When a conductive polymer is used for the positive electrode material of an electrochemical device, diffusivity of anions tends to decrease at a low temperature. As a result, performance (for example, capacitance) at the low temperature tends to decrease.

An electrochemical device electrode according to one aspect of the present invention includes a conductive polymer as an active material. The conductive polymer has a grain shape, and an intensity distribution pattern obtained by X-ray diffraction measurement with respect to the conductive polymer has a first peak in which a diffraction angle 2θ ranges from 18° to 21°, inclusive, and a second peak in which a diffraction angle 2θ ranges from 24° to 26°, inclusive.

An electrochemical device according to another aspect of the present invention includes a positive electrode, a negative electrode, a separator disposed between the positive electrode and the negative electrode, and an electrolytic solution. The positive electrode is the above-mentioned electrochemical device electrode.

According to the present invention, it is possible to achieve an electrochemical device in which performance deterioration in a low temperature environment can be suppressed.

DESCRIPTION OF EMBODIMENT

Figure 1A:
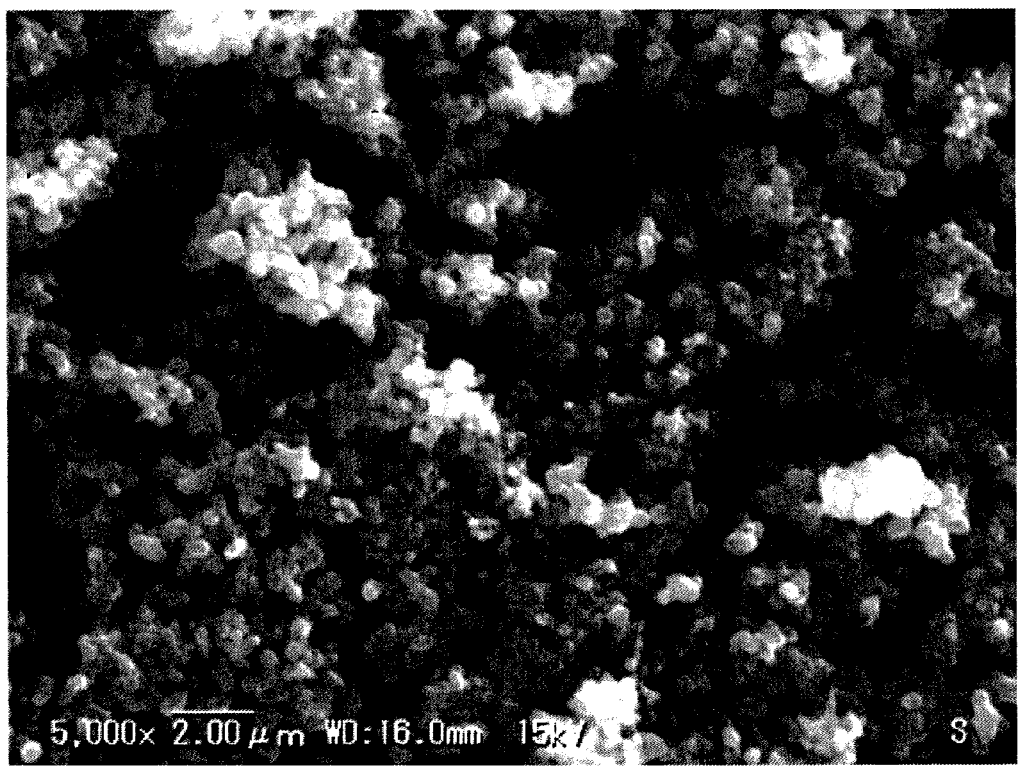
FIG. 1A shows a scanning electron microscope (SEM) photograph of a conductive polymer synthesized to be a grain shape.

When a conductive polymer is used for the positive electrode material of an electrochemical device, diffusivity of anions tends to decrease at a low temperature. As a result, performance (for example, capacitance) at the low temperature tends to decline.

An electrochemical device electrode according to the present exemplary embodiment includes a conductive polymer as an active material. The conductive polymer has a grain shape, and an intensity distribution pattern obtained by X-ray diffraction measurement with respect to the conductive polymer has a first peak in which a diffraction angle 2θ ranges from 18° to 21°, inclusive, and a second peak in which a diffraction angle 2θ ranges from 24° to 26°, inclusive. Here, the diffraction angles 2θ of the first peak and the second peak are values when Cu-Kα rays ($\lambda=1.5418$ Å) are used.

The grain-shaped conductive polymer is a conductive polymer having a structure other than a fibril structure. In the grain-shaped conductive polymer, a particle of the conductive polymer may exist alone, or particles of the conductive polymer may be bound and connected to each other. Contour lines of individual particles can be determined from a grain boundary between the particles. The shapes of the individual particles are not limited to a spherical shape, and may be a shape such as a polyhedron, a cylinder, a polygonal prism, or a rectangular parallelepiped, or an irregular shape deviating from a sphere. An aspect ratio of the particles (ratio of maximum diameter to maximum width orthogonal to maximum diameter) is, for example, less than or equal to 5.0, less than or equal to 3.0, or less than or equal to 2.0. The aspect ratio is obtained as follows.

A scanning electron microscope (SEM) is used to obtain a photographic image of the conductive polymer contained in the active material. A plurality of particles (preferably 100 particles or more) are arbitrarily selected from the obtained image, and image analysis of the contour lines of the particles is performed. The aspect ratio is obtained by calculating an average of a plurality of selected particles.

The grain-shaped conductive polymer can have a larger specific surface area than a fibril-structured conductive polymer, and thus anions that contribute to charge and discharge are easily diffused into the conductive polymer. As a result, even in a low temperature environment, the anions are easily diffused into a crystal structure of the conductive polymer. Hence, a decrease in capacitance at a low temperature can be suppressed.

The grain-shaped conductive polymer can be synthesized, for example, by electropolymerization of a raw material monomer. Electropolymerization is carried out using a reaction solution containing a dopant and a raw material monomer. An oxidizing agent that promotes electropolymerization may be added to the reaction solution. Whether the conductive polymer after synthesis has a grain shape or a fibril structure depends on a combination of a dopant species and a solvent of the reaction solution (and oxidizing agent).

Similarly, chemical polymerization is carried out using a reaction solution containing a dopant, an oxidizing agent, and a raw material monomer. Depending on the combination of the dopant species, the oxidizing agent, and the solvent of the reaction solution, it is possible to select whether the conductive polymer after synthesis has a grain shape or a fibril structure.

Usually, water is used as the solvent of the reaction solution. The dopant includes, for example, sulfate ions. However, for example, in the electropolymerization of polyaniline, when water is used as a solvent and sulfate ions are contained in the dopant, fibril-structured polyaniline is easily synthesized. On the other hand, when a nonaqueous solvent is used, grain-shaped polyaniline is easily synthesized. It is considered that the reason for this is that by using a highly viscous nonaqueous solvent, polymerization reaction of aniline proceeds slowly, a polymer with a short molecular chain length is synthesized, and polymers with short molecular chain lengths are aggregated while spreading isotropically.

Examples of the nonaqueous solvent include alcohols such as ethyl alcohol, methyl alcohol, isopropyl alcohol, ethylene glycol, glycerin, and propylene glycol, acetone, and acetonitrile. Among these nonaqueous solvents, ethylene glycol is preferable because of high solubility of aniline and chemical stability with respect to sulfuric acid.

Figure 1B:
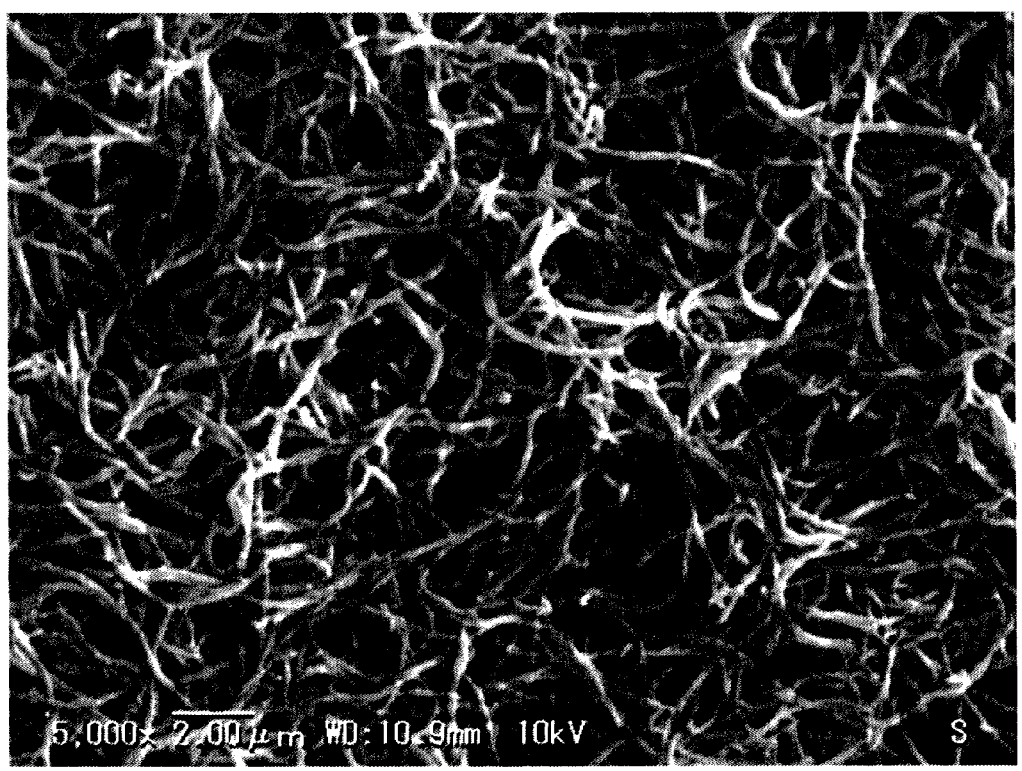
FIG. 1B shows an SEM photograph of a conductive polymer synthesized to be a fibril structure.

FIG. 1A shows an SEM photograph of the conductive polymer (polyaniline) synthesized by the above method. On the other hand, FIG. 1B shows an SEM photograph of a fibril-structured conductive polymer (polyaniline). In FIG. 1A, it can be seen that a large number of conductive polymer fine particles (particle size of about 300 nm) are connected to form a complex three-dimensional structure. As a result, the specific surface area of the conductive polymer shown in FIG. 1A is significantly larger than that of the fibril-structured conductive polymer shown in FIG. 1B.

When the grain-shaped conductive polymer synthesized by the above method is analyzed by the X-ray diffraction measurement, the first peak at a low diffraction angle and the second peak at a high diffraction angle can be observed. From an intensity distribution pattern obtained by X-ray diffraction measurement, it is presumed that the conductive polymer has an orthorhombic crystal structure, and that the first peak at the low diffraction angle is due to a (110) plane and the second peak at the high diffraction angle is due to a (200) plane.

Figure 2:
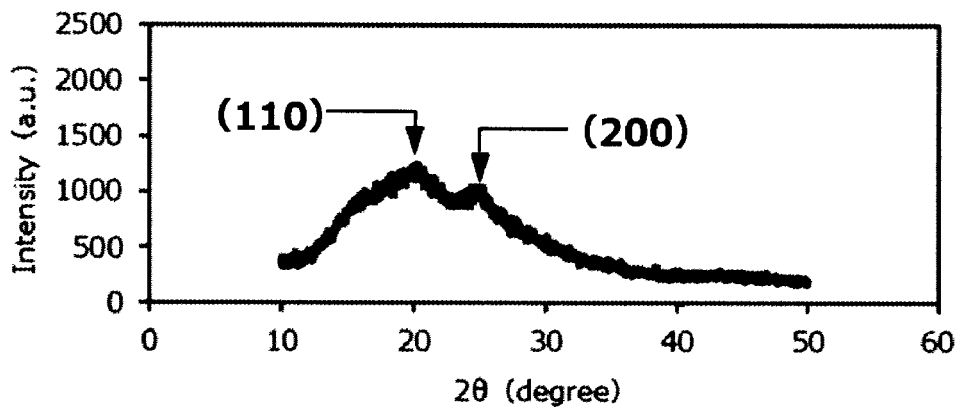
FIG. 2 is an example of a diagram showing an intensity distribution pattern obtained by X-ray diffraction measurement with respect to a conductive polymer.

FIG. 2 shows the intensity distribution pattern obtained by X-ray diffraction measurement with respect to the grain-shaped conductive polymer (polyaniline) synthesized by the method of the present disclosure. The two peaks are observed, including the first peak at the low diffraction angle and the second peak at a high diffraction angle.

The conductive polymer preferably satisfies a relational expression: $L_1 \cdot S/L_2 \geq 7.6$. Here, $L_1$ represents a crystallite size (nm) corresponding to the first peak, $L_2$ represents a crystallite size corresponding to the second peak, and S represents the specific surface area (m$^2$/g) of the conductive polymer. It has been found that in an electrochemical device using an electrochemical device electrode satisfying this condition as a positive electrode, the decrease in capacitance at low temperature is remarkably suppressed. Although the reason is still being elucidated, it is considered that, since the crystallite sizes $L_1$ and $L_2$ have a suitable crystallite size ratio with respect to the specific surface area S, the anions are easily diffused in the conductive polymer. As a result, the anion can penetrate into the crystal of the conductive polymer even at a low temperature. Hence, it is considered that the decrease in capacitance is suppressed.

In the conductive polymer, it is considered that in a solid phase, molecular chains are oriented in one direction to form a one-dimensional chain, and the one-dimensional chains are arranged on the same plane to form a layer of the conductive polymer. In this case, considering the result of the X-ray diffraction measurement, a distance between the (110) planes is considered to be related to a shortest distance between the conductive polymers adjacent to each other in the layer or between the layers, and a distance between the (200) planes is considered to be related to a distance between the conductive polymers adjacent to each other in the one-dimensional chain. In this case, the larger $L_1$ is, the larger the distance between the adjacent conductive polymers is, so that a space where the anions can be diffused is widened between the adjacent conductive polymers. Thus, the larger $L_1$ is, the easier it is for the anions to diffuse. On the other hand, when $L_2$ is large, a path length when the anions are diffused in the one-dimensional chain becomes long. Thus, the smaller $L_2$ is, the easier it is for the anions to diffuse in the conductive polymer. The larger the specific surface area S is, the easier it is for the anions to diffuse in the conductive polymer. As a result, diffusivity of the anion is considered to depend on a product of a ratio of $L_1/L_2$ and S. Meanwhile, the above description shows the present view of the inventor and does not limit the present invention.

The crystallite size L ($L_1$, $L_2$) is calculated by a Scherrer method based on the following equation using a spread (half width) of a corresponding peak of a diffracted X-ray.

$$L = K \cdot \lambda / \beta \cos \theta$$

Here, K represents a Scherrer constant, and K=0.89. λ represents a wavelength of X-rays, and β represents a half width of the diffracted X-rays of a test sample (conductive polymer). The full width shall be the full width at half maximum.

Although there is no limit on the X-rays used for the X-ray diffraction measurement, Cu-Kα rays (λ=1.5418 Å) can be used accurately and easily. When the X-rays other than the Cu-Kα rays are used, the above-mentioned diffraction angles 2θ of the first peak and the second peak are obtained by converting the measured diffraction angle into the diffraction angle when measurement is performed using the Cu-Kα rays. As an apparatus for X-ray diffraction measurement, for example, RINT2000 manufactured by Rigaku Corporation can be used.

The specific surface area S means a BET specific surface area. The specific surface area S is preferably more than or equal to 7.8 m$^2$/g, and more preferably more than or equal to 15 m$^2$/g, from the viewpoint of facilitating storage or release of anions into or from the conductive polymer during charging and discharging to maintain a low reaction resistance. On the other hand, when the specific surface area S is excessively large, an amount of the conductive polymer occupying the electrode decreases, and thus the capacitance is likely to decrease. The specific surface area S is preferably less than or equal to 100 m$^2$/g from the viewpoint of maintaining high capacitance per volume.

The BET specific surface area of the active material in the electrochemical device electrode is calculated by the following method.

First, the electrochemical device electrode having a surface from which the conductive polymer having a grain shape is exposed is cut out to a predetermined size (for example, 4 cm×5 cm).

Next, a cut-out electrode piece is immersed in a volatile solvent (for example, dimethyl carbonate) for 2 minutes, and then the solvent is removed. This procedure is repeated twice (cleaning step 1).

In addition, the electrode piece is similarly immersed in the volatile solvent and then left for 5 minutes in a space whose pressure has been reduced to −0.09 MPa (gauge pressure). Then, the pressure is returned to atmospheric pressure to remove the solvent. The immersion and removal of the solvent are repeated twice (cleaning step 2).

Subsequently, the electrode piece is left for 30 minutes in a space whose pressure has been reduced to −0.10 MPa (gauge pressure) (drying step). Then, the pressure is returned to atmospheric pressure, and the BET specific surface area is measured.

The cleaning step and the drying step described above can be performed using, for example, Vacprep 061 manufactured by Micromeritics Instrument Corporation. The BET specific surface area can be measured using, for example, Tristar II manufactured by Shimadzu Corporation.

The crystallite size $L_1$ ranges, for example, from 50 nm to 200 nm, inclusive, and may range from 80 nm to 170 nm, inclusive. The crystallite size $L_2$ ranges, for example, from 100 nm to 400 nm, inclusive, and may range from 160 nm to 340 nm, inclusive.

As the conductive polymer, polyanilines are preferable. Polyaniline refers to a polymer having aniline ($C_6H_5$—$NH_2$) as a monomer and having an amine structural unit of $C_6H_4$—NH—$C_6H_4$—NH— and/or an imine structural unit of $C_6H_4$—N=$C_6H_4$=N— in a conjugated relationship. Meanwhile, polyaniline that can be used as the conductive polymer is not limited to this. For example, a derivative in which an alkyl group such as a methyl group is added to a part of a benzene ring, a derivative in which a halogen group or the like is added to a part of a benzene ring, and the like are included in polyanilines as long as they are polymers having an aniline as a basic skeleton.

The electrochemical device according to the present exemplary embodiment includes a positive electrode, a negative electrode, a separator disposed between the positive electrode and the negative electrode, and an electrolytic solution. The electrochemical device electrode is used as the positive electrode.

The positive electrode contains a conductive polymer which is a positive electrode material. The negative electrode includes a negative electrode material. The conductive polymer contributes to charging and discharging by doping and dedoping the anion with respect to the positive electrode.

Meanwhile, the negative electrode material contributes to charging and discharging by storing and releasing a cation with respect to the negative electrode. The cation is preferably a lithium ion.

«Electrochemical Device»

Figure 3:
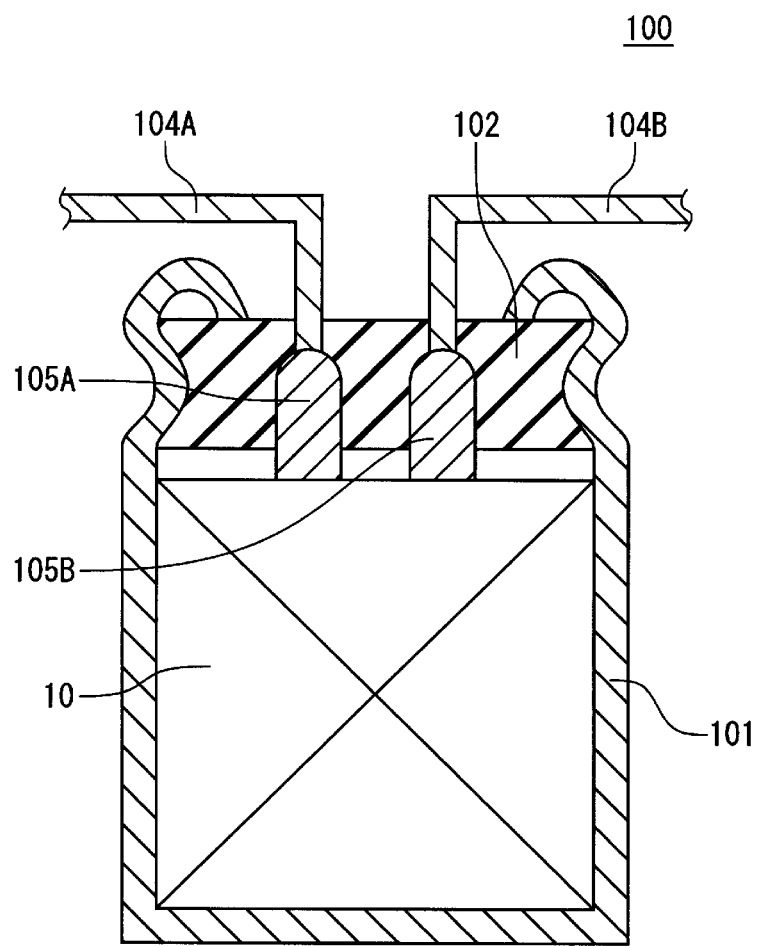
FIG. 3 is a schematic cross-sectional view illustrating an electrochemical device according to one exemplary embodiment of the present disclosure.

Hereinafter, a configuration of the electrochemical device according to the present exemplary embodiment will be described more specifically with reference to the drawings as appropriate. FIG. 3 is a schematic cross-sectional view illustrating electrochemical device 100 according to the present exemplary embodiment, and FIG. 4 is a schematic view in which a part of electrode group 10 included in electrochemical device 100 is developed.

As shown in FIG. 3, electrochemical device 100 includes electrode group 10, container 101 that houses electrode group 10, sealing body 102 that closes an opening of container 101, lead wires 104A, 104B that are led out from sealing body 102, and lead tabs 105A, 105B that connect between respective lead wires 104A, 104B and respective electrodes of electrode group 10. Container 101 is drawn to the inside at the vicinity of an opening end thereof, and the opening end is curled to swage sealing body 102.

Figure 4:
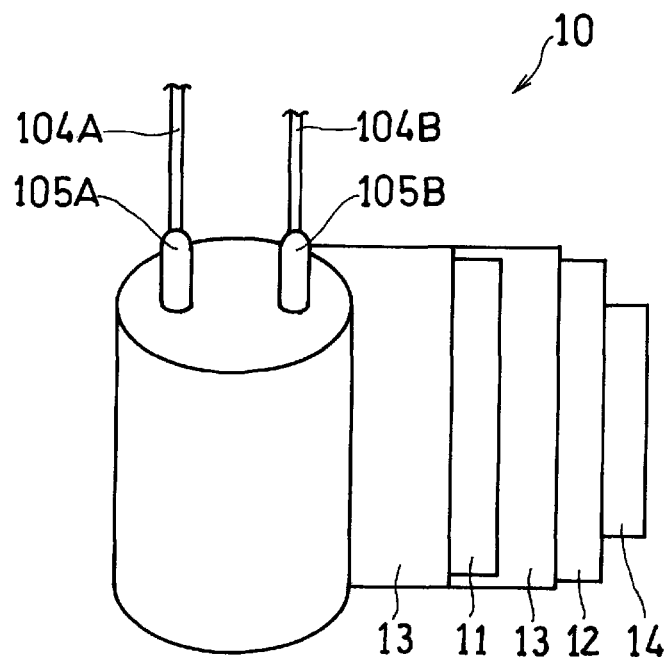
FIG. 4 is a schematic view for explaining a configuration of an electrode group according to the exemplary embodiment.

As shown in FIG. 4, electrode group 10 includes positive electrode 11, negative electrode 12, and separator 13 disposed between positive electrode 11 and negative electrode 12.

(Positive Electrode)

Positive electrode 11 includes, for example, a positive electrode current collector, a carbon layer formed on the positive electrode current collector, and an active layer formed on the carbon layer. The carbon layer contains a conductive carbon material, and the active layer contains a conductive polymer as an active material.

The positive electrode current collector is made of, for example, a metal material, and a natural oxide film is likely to be formed on a surface of the positive electrode current collector. Thus, in order to reduce resistance between the positive electrode current collector and the active layer, a carbon layer containing a conductive carbon material can be formed on the positive electrode current collector. Meanwhile, although the carbon layer does not have to be formed, by providing the carbon layer, the resistance between the positive electrode current collector and the active layer can be suppressed to a low level. When the active layer is formed by electropolymerization or chemical polymerization, the formation of the active layer becomes easy.

(Positive Electrode Current Collector)

For the positive electrode current collector, for example, a sheet-shaped metal material is used. As the sheet-shaped metal material, for example, a metal foil, a metal porous body, a punching metal, an expanded metal, an etching metal, or the like is used. As a material of the positive electrode current collector, for example, aluminum, aluminum alloy, nickel, titanium and the like can be used, and aluminum and aluminum alloy are preferably used.

The thickness of the positive electrode current collector ranges, for example, from 10 μm to 100 μm, inclusive.

(Carbon Layer)

The carbon layer is formed, for example, by applying a carbon paste containing a conductive carbon material to the surface of the positive electrode current collector to form a coating film, and then drying the coating film. The carbon paste is, for example, a mixture of a conductive carbon material, a polymer material, and water or an organic solvent.

Usually, as the polymer material contained in the carbon paste, electrochemically stable fluororesin, acrylic resin, polyvinyl chloride, synthetic rubber (for example, styrene-butadiene rubber (SBR), etc.), water glass (polymer of sodium silicate), imide resin, and the like are used.

As the conductive carbon material, graphite, hard carbon, soft carbon, carbon black, and the like can be used. Among these materials, carbon black is preferable because it is easy to form thin carbon layer 112 having excellent conductivity. The average particle size D1 of the conductive carbon material is not particularly limited, and ranges, for example, from 3 nm to 500 nm, inclusive, preferably from 10 nm to 100 nm, inclusive. The average particle size is a median diameter (D50) in a volume-based particle size distribution obtained by a laser diffraction particle size distribution analyzer (the same applies hereafter). The average particle size D1 of carbon black may be calculated by observing with a scanning electron microscope.

The thickness of the carbon layer ranges preferably from 0.5 µm to 10 µm, inclusive, more preferably from 0.5 µm to 3 µm, inclusive, and particularly preferably from 0.5 µm to 2 µm, inclusive. The thickness of the carbon layer can be calculated as an average value of 10 arbitrary points by observing a cross section of positive electrode 11 with a scanning electron microscope (SEM). The thickness of the active layer can be calculated in the same manner.

(Active Layer)

The active layer contains a conductive polymer as an active material. The active layer is formed, for example, by immersing a positive electrode current collector in a reaction solution containing a raw material monomer of a conductive polymer and electropolymerizing the raw material monomer in the presence of the positive electrode current collector. At this time, by performing electropolymerization with the positive electrode current collector as the anode, the active layer containing the conductive polymer is formed so as to cover the surface of the carbon layer. The thickness of the active layer can be easily controlled by, for example, appropriately changing a current density of electrolysis and a polymerization time. The thickness of the active layer ranges, for example, from 10 µm to 300 µm, inclusive.

The active layer may be formed by a method other than electropolymerization. For example, an active layer containing a conductive polymer may be formed by chemically polymerizing a raw material monomer. Alternatively, a pre-prepared conductive polymer or a dispersion or solution thereof may be used to form the active layer.

The raw material monomer used in electropolymerization or chemical polymerization may be any polymerizable compound capable of producing a conductive polymer by polymerization. The raw material monomer may contain an oligomer. As the raw material monomer, for example, aniline, pyrrole, thiophene, furan, thiophene vinylene, pyridine, or derivatives thereof are used. These raw material monomers may be used alone or in combination of two or more of these raw material monomers. The raw material monomer is preferably aniline that allows the active layer to be easily formed on the surface of the carbon layer.

As the conductive polymer, a π-conjugated polymer is preferable. As the π-conjugated polymer, polypyrrole, polythiophene, polyfuran, polyaniline, polythiophene vinylene, polypyridine, or derivatives of these polymers can be used, for example. These polymers may be used alone or in combination of two or more of these polymers. A weight-average molecular weight of the conductive polymer is not particularly limited and ranges, for example, from 1,000 to 100,000, inclusive.

Derivatives of polypyrrole, polythiophene, polyfuran, polyaniline, polythiophene vinylene, and polypyridine mean polymers having, as a basic skeleton, polypyrrole, polythiophene, polyfuran, polyaniline, polythiophene vinylene, and polypyridine, respectively. For example, a polythiophene derivative includes poly(3,4-ethylenedioxythiophene) (PEDOT) and the like. For example, in the case of polyaniline, polyaniline and its derivatives are collectively referred to as polyanilines as described above.

It is preferable that electropolymerization or chemical polymerization is carried out using a reaction solution containing an anion (dopant). It is preferable that the dispersion liquid or solution of the conductive polymer also contains a dopant. A π-electron conjugated polymer exerts excellent conductivity by doping with a dopant. For example, in chemical polymerization, the positive electrode current collector may be immersed in a reaction solution containing a dopant, an oxidizing agent, and a raw material monomer, and then withdrawn from the reaction solution and dried. In the electropolymerization, a positive electrode current collector and a counter electrode may be immersed in a reaction solution containing a dopant and a raw material monomer, the positive electrode current collector may be used as an anode, the counter electrode may be used as a cathode, and a current may be flowed between them.

Although water may be used as the solvent of the reaction solution, it is preferable to use a nonaqueous solvent because a conductive polymer having a grain shape can be easily obtained. The nonaqueous solvent having a high solubility of the monomer is preferable. Furthermore, the nonaqueous solvent having a high viscosity is preferable because a conductive polymer having a grain shape can be easily obtained. Examples of a dispersion medium or solvent of the conductive polymer include water and the nonaqueous solvent described above.

Examples of the dopant include a sulfate ion, a nitrate ion, a phosphate ion, a borate ion, a benzenesulfonate ion, a naphthalenesulfonate ion, a toluenesulfonate ion, a methanesulfonate ion ($CF_3SO_3^-$), a perchlorate ion ($ClO_4^-$), a tetrafluoroborate ion ($BF_4^-$), a hexafluorophosphate ion ($PF_6^-$), a fluorosulfate ion ($FSO_3^-$), a bis(fluorosulfonyl) imide ion ($N(FSO_2)_2^-$), and a bis(trifluoromethanesulfonyl) imide ion ($N(CF_3SO_2)_2^-$). These dopants may be used alone or in combination of two or more of these dopants.

The dopant may be a polymer ion. Examples of the polymer ion include ions of polyvinylsulfonic acid, polystyrenesulfonic acid, polyallylsulfonic acid, polyacrylsulfonic acid, polymethacrylsulfonic acid, poly(2-acrylamido-2-methylprop anesulfonic acid), polyisoprenesulfonic acid, polyacrylic acid, and the like. These polymer ions may be a homopolymer or a copolymer of two or more monomers. These polymer ions may be used alone or in combination of two or more of these polymer ions.

A pH of the reaction solution, the dispersion liquid of the conductive polymer, or the solution of the conductive polymer is preferably 0 to 4 in that an active layer is easily formed.

The active layer may contain a conductive agent, a binder and the like in addition to the conductive polymer. As the conductive agent and the binder, those exemplified in a negative electrode material layer described later can be used.

(Negative Electrode)

The negative electrode has, for example, a negative electrode material layer containing a negative electrode active material. The negative electrode material layer is generally supported on a negative electrode current collector. For the negative electrode current collector, for example, a sheet-shaped metal material is used. As the sheet-shaped metal material, for example, a metal foil, a metal porous body, a punching metal, an expanded metal, an etching metal, or the like is used. The material of the negative electrode current collector may be, for example, copper, a copper alloy, nickel, stainless steel, or the like.

The negative electrode active material has an action of electrochemically storing and releasing cations. Examples of the material having such an action include a carbon material, a metal compound, an alloy, and a ceramic material. The cation is a lithium ion, for example. The carbon material is preferably graphite, hardly graphitizable carbon (hard carbon) or easily graphitizable carbon (soft carbon), particularly preferably graphite or hard carbon. Examples of the metal compound include silicon oxide and tin oxide.

Examples of the alloy include silicon alloys and tin alloys. Examples of the ceramic material include lithium titanate and lithium manganate. These materials may be used alone or in combination of two or more of these materials. In particular, the carbon material is preferable from the viewpoint that the material is capable of lowering the potential of the negative electrode.

The negative electrode material layer preferably includes, in addition to the negative electrode active material, a conductive agent, a binder, and the like. Examples of the conductive agent include carbon black and carbon fibers. Examples of the binder include a fluororesin, an acrylic resin, a rubber material, and a cellulose derivative. Examples of the fluorine resin include polyvinylidene fluoride, polytetrafluoroethylene, and a tetrafluoroethylene-hexafluoropropylene copolymer. Examples of the acrylic resin include polyacrylic acid and an acrylic acid-methacrylic acid copolymer. Examples of the rubber material include a styrene-butadiene rubber, and examples of the cellulose derivative include carboxymethyl cellulose.

The negative electrode material layer is formed by, for example, preparing a negative electrode mixture paste that contains a mixture of a negative electrode active material, a conducting agent, a binder, and the like with a dispersion medium and applying the negative electrode mixture paste to the negative electrode current collector, followed by drying.

When lithium ion is used as the cation, the negative electrode is preferably pre-doped with lithium ions in advance. This lowers potential of the negative electrode to increase a difference in potential between the positive electrode and the negative electrode (that is, voltage) and thus improve energy density of an electrochemical device.

Pre-doping of the negative electrode with lithium ions is advanced by, for example, forming a metal lithium layer that serves as a supply source of lithium ions on a surface of the negative electrode material layer and impregnating the negative electrode having the metal lithium layer with an electrolytic solution (for example, nonaqueous electrolytic solution) having lithium ion conductivity. At this time, lithium ions are eluted from the metal lithium layer into the nonaqueous electrolytic solution, and the eluted lithium ions are stored in the negative electrode active material. For example, when graphite or hard carbon is used as the negative electrode active material, lithium ions are inserted in between layers of graphite or in fine pores of hard carbon. An amount of lithium ions to be pre-doped can be controlled by a mass of the metal lithium layer.

A step of pre-doping the negative electrode with lithium ions may be performed before assembling the electrode group, or pre-doping may be advanced after the electrode group is housed together with the electrolytic solution in a case of an electrochemical device.

(Separator)

As the separator, a nonwoven fabric made of cellulose fiber, a nonwoven fabric made of glass fiber, a microporous membrane made of polyolefin, a fabric cloth, a nonwoven fabric, and the like are preferably used. Examples of fibers constituting a fabric cloth and a nonwoven fabric include polymer fibers such as polyolefin, cellulose fibers, and glass fibers. These materials may be used in combination.

The thickness of the separator ranges, for example, from 10 μm to 300 μm, inclusive. The thickness of separator 13 ranges, for example, from 10 μm to 40 μm, inclusive, in the case of a microporous membrane, and, for example, from 100 μm to 300 μm, inclusive, in the case of a fabric cloth and a nonwoven fabric.

(Electrolytic Solution)

The electrode group includes a nonaqueous electrolytic solution.

The nonaqueous electrolytic solution has lithium ion conductivity and contains a lithium salt and a nonaqueous solvent that dissolves the lithium salt. At this time, the anion of the lithium salt can reversibly repeat doping and dedoping in and from the positive electrode. Meanwhile, lithium ions derived from the lithium salt are reversibly stored in and released from the negative electrode.

Examples of the lithium salt include $LiClO_4$, $LiBF_4$, $LiPF_6$, $LiAlCl_4$, $LiSbF_6$, LiSCN, $LiCF_3SO_3$, $LiFSO_3$, $LiCF_3CO_2$, $LiAsF_6$, $LiB_{10}Cl_{10}$, LiCl, LiBr, LiI, $LiBCl_4$, $LiN(FSO_2)_2$, and $LiN(CF_3SO_2)_2$. These lithium salts may be used alone or in combination of two or more of these lithium salts. Among these lithium salts, desirably used is at least one selected from the group consisting of a lithium salt having a halogen atom-containing oxo acid anion suitable for an anion, and a lithium salt having an imide anion. Concentration of the lithium salt in the nonaqueous electrolytic solution may range, for example, from 0.2 mol/L to 4 mol/L, inclusive, and is not particularly limited.

Examples of the nonaqueous solvent that can be used include cyclic carbonates such as ethylene carbonate, propylene carbonate, and butylene carbonate; chain carbonates such as dimethyl carbonate, diethyl carbonate, and ethyl methyl carbonate; aliphatic carboxylate esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide, 1,3-dioxolane, formamide, acetamide, dimethylformamide, dioxolane, acetonitrile, propionitrile, nitromethane, ethyhnonoglyme, trimethoxymethane, sulfolane, methyl sulfolane, and 1,3-propanesultone. These nonaqueous solvents may be used alone or in combination of two or more of these nonaqueous solvents.

The nonaqueous electrolytic solution may contain an additive, if necessary. For example, an unsaturated carbonate such as vinylene carbonate, vinyl ethylene carbonate, or divinyl ethylene carbonate may be added as an additive for forming a coating having high lithium ion conductivity on the surface of the negative electrode.

(Manufacturing Method)

Hereinafter, one example of the method for manufacturing an electrochemical device according to the present invention is described with reference to FIGS. 3 and 4. However, the method for manufacturing an electrochemical device according to the present invention is not limited to this example.

Electrochemical device 100 is manufactured by, for example, a method including a step of applying a carbon paste to a positive electrode current collector to form a coating film and then drying the coating film to form a carbon layer, a step of forming an active layer containing a conductive polymer on the carbon layer to obtain positive electrode 11, and a step of stacking positive electrode 11 obtained, separator 13, and negative electrode 12 in this order. In addition, electrode group 10 obtained by stacking positive electrode 11, separator 13, and negative electrode 12 in this order is housed in container 101 together with the nonaqueous electrolytic solution. The active layer is usually formed in an acidic atmosphere due to an influence of an oxidizing agent and a dopant used.

A method of applying the carbon paste to the positive electrode current collector is not particularly limited, and as conventional application methods, for example, a screen printing method, a coating method using various coaters such as a blade coater, a knife coater, and a gravure coater, a spin coating method, and the like can be mentioned.

As described above, the active layer is formed by, for example, electropolymerizing or chemically polymerizing a raw material monomer in the presence of a positive electrode current collector including a carbon layer. Electropolymerization or chemical polymerization may be performed using a reaction solution containing a raw material monomer and a nonaqueous solvent. Alternatively, the active layer is formed by applying a solution containing a conductive polymer, a dispersion of the conductive polymer, or the like to the positive electrode current collector including the carbon layer.

A lead member (lead tab 105A including lead wire 104A) is connected to positive electrode 11 obtained as described above, and another lead member (lead tab 105B including lead wire 104B) is connected to negative electrode 12. Subsequently, positive electrode 11 and negative electrode 12 to which these lead members are connected are wound with separator 13 interposed between positive electrode 11 and negative electrode 12 to obtain electrode group 10 that has the lead members exposed from one end surface of the electrode group, as shown in FIG. 4. An outermost circumference of electrode group 10 is fixed with winding stop tape 14.

Next, as shown in FIG. 3, electrode group 10 is housed together with a nonaqueous electrolytic solution (not shown) in bottomed cylindrical container 101 having an opening. Lead wires 104A, 104B are led out from sealing body 102. Sealing body 102 is disposed in the opening of container 101 to seal container 101. Specifically, container 101 is, at a part near an opening end, processed inward by drawing, and is, at the opening end, curled to swage sealing body 102. Sealing body 102 is formed of, for example, an elastic material containing a rubber component.

In the above exemplary embodiment, a wound cylinder-shaped electrochemical device has been described. An application range of the present invention, however, is not limited to the example described above, and the present invention can also be applied to a wound square-shaped or stacked electrochemical device.

EXAMPLES

Hereinafter, the present invention will be described in more detail based on Examples, but the present invention is not limited to Examples.

«Electrochemical Device A1»

(1) Fabrication of Positive Electrode

An aluminum foil having a thickness of 30 μm was prepared as a positive electrode current collector. Meanwhile, an aniline solution in which aniline and sulfuric acid were dissolved in ethylene glycol was prepared.

A mixed powder obtained by mixing 11 parts by mass of carbon black and 7 parts by mass of polypropylene resin particles was kneaded with water to prepare a carbon paste. The obtained carbon paste was applied to the entire front and back surfaces of the positive electrode current collector and then dried by heating to form a carbon layer. The thickness of the carbon layer was 2 μm per each surface.

The positive electrode current collector on which the carbon layer was formed and a counter electrode were immersed in the aniline solution and electropolymerized at a current density of 1.7 mA/cm$^2$ for 45 minutes, and a conductive polymer (polyaniline) film doped with sulfate ions ($SO_4^{2-}$) was attached onto the carbon layers on the front and back of the positive electrode current collector.

The conductive polymer doped with sulfate ions was reduced to dedope the doped sulfate ions. In this way, a conductive polymer-containing active layer from which sulfate ions had been dedoped was formed. The active layer was then thoroughly washed and then dried. The thickness of the active layer was 35 μm per each surface.

(2) Fabrication of Negative Electrode

A copper foil having a thickness of 10 μm was provided as a negative electrode current collector. Meanwhile, a carbon paste was prepared by kneading a mixed powder, containing 97 parts by mass of hard carbon, 1 part by mass of carboxycellulose, and 2 parts by mass of styrene butadiene rubber, with water at a weight ratio of 40:60 (mixed powder:water). The carbon paste was applied to both surfaces of the negative electrode current collector and dried to produce a negative electrode having a negative electrode material layer having a thickness of 35 μm on each surface. Then, a metal lithium foil in an amount calculated such that the negative electrode potential in the electrolytic solution after completion of the pre-doping was less than or equal to 0.2 V with respect to metal lithium was attached to the negative electrode material layer.

(3) Fabrication of Electrode Group

A lead tab was connected to each of the positive electrode and the negative electrode. Then, as shown in FIG. 4, a laminate obtained by alternately laminating cellulose nonwoven fabric separators (each having a thickness of 35 μm) with a positive electrode and a negative electrode was wound up to form an electrode group.

(4) Preparation of Electrolytic Solution

A solvent was prepared by adding 0.2% by mass of vinylene carbonate to a mixture of propylene carbonate and dimethyl carbonate in a volume ratio of 1:1. LiPF$_6$ as a lithium salt was dissolved in the obtained solvent at a predetermined concentration to prepare a nonaqueous electrolytic solution having hexafluorophosphate ion ($PF_6^-$) as an anion.

(5) Fabrication of Electrochemical Device

The electrode group and the nonaqueous electrolytic solution were put into a bottomed container having an opening to assemble an electrochemical device as shown in FIG. 1. Then, the electrochemical device was aged at 25° C. for 24 hours while a charging voltage of 3.8 V was applied between terminals of the positive electrode and the negative electrode to advance the pre-doping of the lithium ions into the negative electrode. In this way, an electrochemical device A1 was fabricated.

«Electrochemical Devices A2 to A6»

In the fabrication of the positive electrode, the current to flow and the time period for which the current was let flow were changed in the polyaniline synthesis by electropolymerization.

Except for this, electrochemical devices A2 to A6 were produced in the same manner as the electrochemical device A1.

Table 1 shows conditions when polyaniline was synthesized by electropolymerization in the electrochemical devices A1 to A6. In the electrochemical devices A1 to A5, a product of the time required for polymerization and the current density flowed during polymerization was made substantially constant, and an amount of charge flowed during polymerization was made substantially constant.

TABLE 1

| Electrochemical device | Polymerization time/[min] | Polymerization current density/[mA/cm$^2$] |
|---|---|---|
| A1 | 45.0 | 1.7 |
| A2 | 18.0 | 4.2 |
| A3 | 9.0 | 8.4 |
| A4 | 4.5 | 16.8 |
| A5 | 1.8 | 42.0 |
| A6 | 45.0 | 8.4 |

For the electrochemical devices A1 to A6, when the surface of the positive electrode was observed by SEM, it was confirmed that polyaniline was formed in a grain shape.

Furthermore, for the electrochemical devices A1 to A6, the BET specific surface area S and the crystallite sizes $L_1$ and $L_2$ of the active layer were measured by the above-mentioned method. Table 2 shows the measurement results.

The electrochemical devices A1 to A6 were evaluated according to the following method.

In an environment of 25° C., the electrochemical device was charged with a voltage of 3.8 V and then discharged to 2.5 V with a current of 5.0 Å. An amount of charge flowed while the voltage dropped from 3.3 V to 3.0 V was measured on the way of the discharging. And the amount of charge was divided by a voltage change ΔV (=0.3 V) to calculate initial capacitance $C_0$ (F).

Subsequently, the electrochemical device was placed in an environment of −10° C. The electrochemical device was charged with a voltage of 3.8 V in the environment of −10° C. and then discharged to 2.5 V with a current of 5.0 Å. The amount of charge flowed while the voltage dropped from 3.3 V to 3.0 V was measured on the way of the discharging. And the amount of charge was divided by the voltage change ΔV (=0.3 V) to calculate capacitance $C_1$ (F).

A ratio (%) of the capacitance $C_1$ for the environment of −10° C. to the initial capacitance $C_0$ was evaluated as the capacitance retention rate. That is, a capacitance retention rate R was evaluated by $R=C_1/C_0\times100$.

Table 2 shows evaluation results of the crystallite sizes $L_1$ and $L_2$ of the electrochemical devices A1 to A6, the BET specific surface area S, the parameter X (=$L_1\cdot S/L_2$), and the capacitance retention rate R.

TABLE 2

| Electrochemical device | Crystallite size [nm] | | BET specific surface area S [m$^2$/g] | X | $C_1/C_0$ [%] |
| | $L_1$ | $L_2$ | | | |
|---|---|---|---|---|---|
| A1 | 166 | 346 | 15.8 | 7.6 | 81.3 |
| A2 | 124 | 222 | 17.8 | 10.0 | 79.8 |
| A3 | 119 | 239 | 18.3 | 9.1 | 78.9 |
| A4 | 98 | 231 | 20.5 | 8.7 | 76.4 |
| A5 | 88 | 159 | 26.3 | 14.6 | 83.8 |
| A6 | 127 | 247 | 7.7 | 3.9 | 55.0 |

Table 2 shows the general trend that the larger the BET specific surface area S, the better the capacitance retention rate R. However, when the electrochemical devices A2 to A4 are compared, the electrochemical device A2 having a small BET specific surface area S shows a higher capacitance retention rate R than the electrochemical devices A3 and A4. The reason for this is considered to be that in the electrochemical devices A3 and A4, the crystallite size $L_2$ is relatively larger than $L_1$ and $L_1/L_2$ is small.

Figure 5:
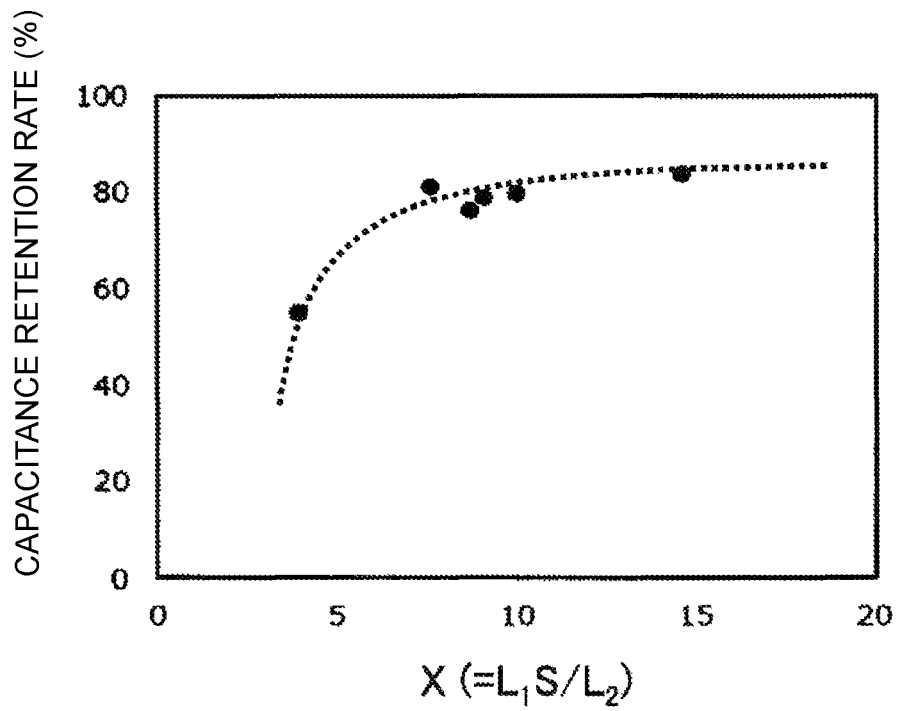
FIG. 5 is a graph showing a relationship between a parameter X ($=L_1 \cdot S/L_2$) and a capacitance retention rate R of the electrochemical device at a low temperature ($-10°$ C.).

FIG. 5 shows a graph of the results in Table 2. It can be seen that when X (=$L_1\cdot S/L_2$) falls below 5, the capacitance retention rate R drops sharply. On the other hand, in a range where X is more than or equal to 7.6, a high capacitance retention rate can be maintained.

The electrochemical device according to the present disclosure is suitable as various electrochemical devices, particularly as a backup power supply.

The invention claimed is:

1. An electrochemical device electrode comprising a conductive polymer as an active material, wherein:
    the conductive polymer has a grain shape and contains polyanilines,
    an intensity distribution pattern obtained by X-ray diffraction measurement with respect to the conductive polymer has a first peak in which a diffraction angle 2θ ranges from 18° to 21°, inclusive, and a second peak in which a diffraction angle 2θ ranges from 24° to 26°, inclusive, and
    the conductive polymer satisfies a relational expression: $7.6\leq L_1\cdot S/L_2\leq 14.6$,
    where $L_1$ represents a crystallite size (nm) corresponding to the first peak, $L_2$ represents a crystallite size (nm) corresponding to the second peak, and S represents the specific surface area (m$^2$/g) of the conductive polymer.

2. The electrochemical device electrode according to claim 1, wherein a specific surface area of the conductive polymer is more than or equal to 15 m$^2$/g.

3. An electrochemical device comprising:
    a positive electrode;
    a negative electrode;
    a separator disposed between the positive electrode and the negative electrode; and
    an electrolytic solution,
    wherein the positive electrode is the electrochemical device electrode according to claim 1.

* * * * *